US008580225B2

(12) United States Patent
Haensel et al.

(10) Patent No.: US 8,580,225 B2
(45) Date of Patent: Nov. 12, 2013

(54) USE OF HYDROPHILIC ORGANOMODIFIED SILOXANES AS A PROCESSING AID FOR MELT GRANULATION

(75) Inventors: Rene Haensel, Dorsten (DE); Sabine Giessler-Blank, Dortmund (DE); Stefan Kempka, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 13/542,299

(22) Filed: Jul. 5, 2012

(65) Prior Publication Data

US 2013/0174380 A1 Jul. 11, 2013

(30) Foreign Application Priority Data

Jul. 5, 2011 (DE) .................. 10 2011 078 624

(51) Int. Cl.
*B05D 1/00* (2006.01)
*B05D 1/02* (2006.01)
*B05D 7/00* (2006.01)
*C01B 17/10* (2006.01)

(52) U.S. Cl.
USPC ....... 423/567.1; 23/313 R; 427/212; 427/215; 427/220; 427/427.4

(58) Field of Classification Search
USPC .............. 423/567.1; 23/313 R; 427/212, 215, 427/220, 427.4
See application file for complete search history.

(56) References Cited

U.S. PATENT DOCUMENTS

| | | | |
|---|---|---|---|
| 3,282,728 A * | 11/1966 | Lacroux et al. | ............... 427/220 |
| 3,507,923 A | 4/1970 | Gessner et al. | |
| 3,637,361 A | 1/1972 | Kita et al. | |
| 3,661,530 A * | 5/1972 | Block | ............... 423/268 |
| 3,957,843 A | 5/1976 | Bennett | |
| 4,025,456 A | 5/1977 | Litteral et al. | |
| 4,059,605 A | 11/1977 | Bennett | |
| 4,147,847 A | 4/1979 | Schweiger | |
| 4,248,825 A | 2/1981 | Coon et al. | |
| 4,279,579 A | 7/1981 | Froeschke | |
| 4,855,379 A | 8/1989 | Budnik et al. | |
| 5,856,369 A | 1/1999 | Jorgenson et al. | |
| 5,877,268 A | 3/1999 | Jorgenson et al. | |
| 6,398,989 B1 | 6/2002 | Bergstrom | |
| 6,552,091 B1 | 4/2003 | Boinowitz et al. | |
| 7,157,541 B2 | 1/2007 | Knott et al. | |
| 7,183,330 B2 | 2/2007 | Furlan et al. | |
| 7,196,153 B2 | 3/2007 | Burkhart et al. | |
| 7,312,364 B2 | 12/2007 | Cramers et al. | |
| 7,612,158 B2 | 11/2009 | Burkhart et al. | |
| 2009/0007483 A1 | 1/2009 | Hansel et al. | |
| 2009/0053552 A1 | 2/2009 | De Gans et al. | |
| 2010/0029519 A1 | 2/2010 | Schwab et al. | |
| 2010/0041629 A1 | 2/2010 | Giessler-Blank et al. | |
| 2010/0084597 A1 | 4/2010 | Schwab et al. | |
| 2010/0105555 A1 | 4/2010 | Giessler-Blank et al. | |
| 2010/0298485 A1 | 11/2010 | Frey et al. | |

FOREIGN PATENT DOCUMENTS

| | | |
|---|---|---|
| DE | 2928401 | 7/1980 |
| DE | 3121929 C1 | 2/1983 |
| DE | 19940797 A1 | 3/2001 |
| DE | 102005001076 A1 | 7/2006 |
| EP | 0064311 | 11/1982 |
| EP | 0066179 A1 | 12/1982 |
| EP | 0493836 B1 | 7/1992 |
| EP | 1360223 | 11/2003 |
| EP | 1439200 B1 | 7/2004 |
| EP | 1520870 A1 | 4/2005 |
| EP | 1544235 A1 | 6/2005 |
| GB | 1537888 | 1/1979 |
| JP | 2-264075 A * | 10/1990 |
| WO | WO02053625 A2 | 7/2002 |

OTHER PUBLICATIONS

"Sandvik—Ihr Partner in der Schmelzengranulierung", PS-442/GER 10.2003, published by the Sandvik group (www.smt.sandvik.com).
"Sandvik Process Systems—Ihr Partner in industrieller Verfahrenstechnik", PS-400 GER 2.2011 published by the Sandvik group (www.smt.sandvik.com).

\* cited by examiner

*Primary Examiner* — Timothy Vanoy
(74) *Attorney, Agent, or Firm* — Scully, Scott, Murphy & Presser, P.C.

(57) ABSTRACT

Use of organomodified polysiloxanes which have at least three different polyether radicals, at least two of these polyether radicals differing by at least 9% by mass in the proportion of ethylene oxide units therein in the total weight of the polyether radical, as a release agent or release agent constituent in melt granulation.

15 Claims, No Drawings

USE OF HYDROPHILIC ORGANOMODIFIED SILOXANES AS A PROCESSING AID FOR MELT GRANULATION

FIELD OF THE INVENTION

The present invention is directed to the use of organomodified polysiloxanes which have at least three different polyether radicals, at least two of these polyether radicals differing by at least 9% by mass in the proportion of ethylene oxide units therein in the total weight of the polyether radical, as a release agent or release agent constituent in a process for melt granulation.

BACKGROUND OF THE INVENTION

Melts are obtained in many industrial chemical processes. For example, large amounts of liquid sulfur arise from what is called the Clauss process in refineries. Various operations are now available for converting the liquid melt to a manageable and solid form. The molten products are converted with an application device to suitable forms such as balls, flakes, pellets or other forms. In some instances, the molten products are converted to homogeneous forms. In other instances, the molten products are converted to homogeneous, very substantially spherical forms (cooling belt plants). In the continuous processes, the industry pays special attention to cleanliness of the conveying devices, which are preferably steel conveyor belts, and good separation of the shaped bodies from the conveying devices, in order that the process can run continuously for prolonged periods. In addition, good meterability of the products and inexpensive and clean packaging of the products are required. More particularly, a homogeneous shape and size of the shaped bodies is important, this requiring good separation of the products from the conveyor belts, in order that these products can be transported further and are meterable accurately at a later stage. If the shape of the melt granules has corners and edges, these can fracture and cause dust to form, particularly in the course of sulfur pelletization. In addition, such bodies are unwanted since they cannot be metered accurately in downstream operations.

Steel belt coolers are a frequently used technology in the solidification of the melts. In the course of this technology, the melt is continuously cooled and solidified. By means of different technologies, it is possible to form a wide variety of different shapes of particular size. Perforated plates are a relatively old technology (see, for example, Aufbereitungstechnik 1970 No. 5, p. 278). These involve conducting a sulfur melt from the Clauss process through one or more perforated plates into a prilling vessel filled with water (see, for example, U.S. Pat. No. 3,637,361).

DE-A 2928401 describes a process for pelletizing sulfur, in which molten sulfur is applied to a metal carrier and cooled until solidification, the application of the molten sulfur to the metal carrier is preceded by application of a composition comprising a solvent, an organic titanate and carboxy-functional siloxanes.

A technology which is widespread nowadays is the solidification of sulfur melts by means of steel belt coolers and the Rotoformer® (Rotoform system), as supplied, for example, by Sandvik Process Systems. This involves supplying the molten sulfur at a temperature of 125° C. to 145° C. to a Rotoformer®, and the latter applies the molten sulfur in droplet form homogeneously to a steel belt, the underside of which is cooled by water, for example by means of spray nozzles, or it is passed through a water bath. In this operation, a good separation of the shaped bodies and homogeneous, very substantially spherical shape of the melt granules is ensured. The principle of these processes is described, for example, in U.S. Pat. Nos. 6,398,989 and 4,279,579, and in the brochures "Sandvik—Ihr Partner in der Schmelzengranulierung", PS-442/GER 10.2003 and "Sandvik Process Systems—Ihr Partner in industrieller Verfahrenstechnik", PS-400 GER 2.2011, each published by the Sandvik group (www.smt.sandvik.com).

Especially in the granulation of sulfur by the various processes for producing particular melt granules, for example pellets, it is necessary to use release agents to prevent possible adhesion to steel belts or other conveying devices. In addition, the release agents have a positive influence on the shape of the melt granules, which improves subsequent packaging and reuse (accurate metering). One example of a frequently used release agent is silicone oil. GB 1 537 888 describes the use of silicone oils of viscosity 20-50 cSt from, for example, Dow Corning. This fluid is sold under the DOW CORNING® 200 FLUID, 20 cSt trade name. The release agent is dispersed in the molten sulfur and simplifies pelletization, which is effected on a cooled steel belt. One disadvantage of this technology is that it is necessary to disperse the silicone oil in the sulfur. Since the silicone oil is a liquid and is completely incompatible with water, which is used to cool and clean the steel belts, there are instances of soiling and greasy residues in the plant, which adversely affect the separation of the shaped bodies from the steel belt cooler. An improvement was achieved by the use of silicone oil emulsions. The application of the emulsion by spraying or else dipping of the steel belts eases the process, but silicone residues adhering on the belts cannot be re-emulsified and therefore lead to soiling. A further disadvantage of the emulsions is the stability thereof. Separation of the silicone oil from the aqueous phase frequently occurs at 35° C., which complicates the use of a silicone oil in refineries in hot countries, since the silicone oil frequently separates even in storage or reservoir vessels, or in conveying devices.

The disadvantage of the products used to date has been reduced by the use of hydrophilic, organically modified siloxanes. A product frequently used, for example by Sandvik among others, is Tegopren® 5863, sold by Evonik Goldschmidt GmbH. Tegopren® 5863 is water-soluble, and modified on the siloxane chain with two polyethers of different molar mass, both of which have the same content by mass of ethylene oxide, of about 40% ethylene oxide and about 60% propylene oxide. The product is applied in aqueous solution; the disadvantages of emulsion stability at relatively high temperature are eliminated. However, one disadvantage of this product class is that good separation of the melt granules does not remain constant, and it instead becomes somewhat more difficult as a function of time.

In addition, the shape of the melt granules can deviate slightly from the optimal spherical form. Bulging melt granules are obtained, among which flatter shaped bodies cause the described problems of the thinner edges breaking off and metering problems.

The solidified sulfur is frequently moved between production and reuse (transport, storage, handling, etc), and so preference is given to low evolution of dust and low propensity to fracture.

SUMMARY OF THE INVENTION

In one embodiment, the present invention provides release agents for use in a process for producing sulfur particles, which avoid one or more of the disadvantages of the prior art.

More particularly and in another embodiment, the present invention provides a separating component, e.g., release agent, of very good water solubility, which ensures permanent separation of sulfur granules and, even in the long term, does not give residues on the steel belt which adversely affect the separation or the process running. In one embodiment, the melt granules which are provided have to be homogeneous, very substantially spherical shapes which do not have any fragile edges.

The release agents of the present invention comprise organomodified polysiloxanes of formula (I)

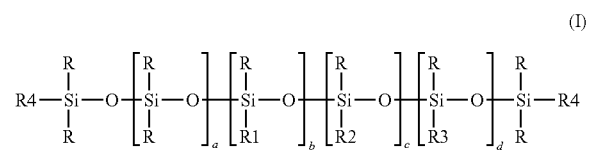

where
$a+b+c+d+2=20$ to 210, preferably 30 to 100, especially 40-60,
$a=15$ to 205, preferably 35 to 45,
$b=1$ to 12, preferably 1 to 8, especially 2 to 6,
$c=1$ to 12, preferably 1 to 8, especially 2 to 6,
$d=1$ to 12, preferably 1 to 8, especially 2 to 6,
the R radicals are each independently identical or different, aliphatic or aromatic hydrocarbyl radicals having 1 to 10 carbon atoms, preferably methyl radicals,
the R4 radicals are each independently identical or different R, R1, R2 or R3 radicals,
the R1, R2 and R3 radicals are each independently different polyether radicals of the general formula (II)

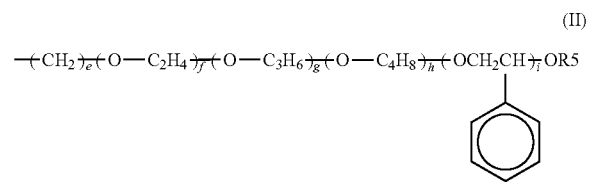

where
e is 3 to 11, preferably 3,
f is 6 to 30, preferably 10 to 30,
g is 0 to 15, preferably 0 to 10,
h is 0 to 5,
i is 0 to 5,
R5 are independently the same or different and are each a methyl, acetyl or hydrogen radical, preferably with the proviso that the molecular weight of the polyether radical of formula (II) is greater than 200 g/mol, preferably from greater than 400 to 2000 g/mol, and the proportion of ethylene oxide is greater than 45% by mass in the polyether, and the percentage by mass of ethylene oxide in the polyether radical R2 is at least 9% by mass greater than the percentage of ethylene oxide in the polyether radical R1, based in each case on the polyether radicals of the formula (II), where the radicals of the formula (II) may each be formed randomly, in a gradient or in blocks.

In some embodiments, the organomodified polysiloxanes are adsorbed onto sulfur granules and thus ensure a very good separation of the melt granules.

The inventive use has the advantage that no residues whatsoever remain on the steel belt. The invention also has the advantage that the melt granules have a homogeneous spherical shape or at least "Hamburger" shape, and thus do not have any edges or flat, fragile regions which can fracture in the course of further processing/packaging. Dusts and irregularly shaped bodies are thus avoided, and a cleaner processing operation and more accurate metering of the melt granules are enabled.

A further advantage of the present invention is that the water solubility of the organomodified polysiloxanes considerably simplifies the use and cleaning of the granulation apparatus. The water solubility also achieves the effect that the release agent can be applied to the steel belt in virtually any thickness, by varying the concentration of the organomodified polysiloxane in the aqueous solution and the amount of the solution applied to the steel belt as a release agent.

DETAILED DESCRIPTION OF THE INVENTION

The subject-matter of the invention is described by way of example hereinafter, without any intention that the invention be restricted to these illustrated embodiments. When ranges, general formulae or compound classes are specified hereinafter, these shall include not only the corresponding ranges or groups of compounds which are mentioned explicitly, but also all sub-ranges and sub-groups of compounds which can be obtained by selecting individual values (ranges) or compounds. When documents are cited in the context of the present description, the content thereof, especially in relation to the matter in whose context the document has been cited, shall form a full part of the disclosure-content of the present invention. If chemical (empirical) formulae are used in the present invention, the indices specified may be either absolute numbers or averages. In polymeric compounds, the indices are preferably averages. Percentages are, unless stated otherwise, figures in percent by weight. If measurements are reported hereinafter, these measurements, unless stated otherwise, have been performed under standard conditions (25° C. and 1013 mbar). If averages are reported hereinafter, these are weight averages, unless stated otherwise.

The terms "melt granule", "granule" and "pellet" are understood in the context of the present invention to be synonymous terms. "Briquettes" shall also be understood in the context of the present invention to be granules or granular materials. The terms "melt granulation" and "melt pelletization" shall be covered hereinafter in the context of the present invention by the collective term "melt granulation".

The inventive process of producing metal granulations features the use of organomodified polysiloxanes of formula (I)

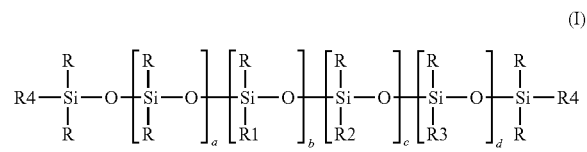

where
$a+b+c+d+2=20$ to 210, preferably 30 to 100, especially 40-60,
$a=15$ to 205, preferably 35 to 45,
$b=1$ to 12, preferably 1 to 8, especially 2 to 6,
$c=1$ to 12, preferably 1 to 8, especially 2 to 6,
$d=1$ to 12, preferably 1 to 8, especially 2 to 6, the R radicals are each independently identical or different, aliphatic or aromatic hydrocarbyl radicals having 1 to 10 carbon atoms, preferably methyl radicals, the R4 radicals are each independently identical or different R, R1, R2 or R3 radicals, the R1, R2 and R3 radicals are each independently different polyether radicals of general formula (II)

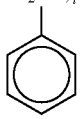

(II)

where e is 3 to 11, preferably 3, f is 6 to 30, preferably 10 to 30, g is 0 to 15, preferably 0 to 10, h is 0 to 5, preferably 0, i is 0 to 5, preferably 0, R5 are independently the same or different and are each a methyl, acetyl or hydrogen radical, preferably a hydrogen or methyl radical, more preferably a hydrogen radical, preferably with the provisos that the molecular weight of the polyether radical of the formula (II) is greater than 200 g/mol, preferably from greater than 400 to 2000 g/mol, and the proportion of ethylene oxide is greater than 45% by mass in the polyether, and at least two of these polyether radicals differ by at least 9% by mass in the proportion of ethylene oxide units therein in the total weight of the polyether radical, where the percentage by mass of ethylene oxide in the polyether radical R2 is preferably at least 9% by mass greater than the percentage of ethylene oxide in the polyether radical R1, based in each case on the polyether radicals of the formula (II), where the radicals of the formula (II) may each be formed randomly, in a gradient or in blocks. The organomodified polysiloxanes of formula (I) are employed in the present invention as a release agent or a release agent constituent.

In formula (II), the units designated by the index 'g' are those which have originated from propylene oxide, the units designated by the index 'h' are those which have originated from butylene oxide, and the units designated by the index 'i' are those which have originated from styrene oxide.

The indices 'a to d' and 'e to i' may be natural whole numbers, or weight averages. The indices are preferably weight averages.

The organomodified polysiloxanes of formula (I) can be obtained, for example, by hydrosilylation from the corresponding unsaturated polyethers and the corresponding SiH-functional siloxanes. In one embodiment, the process used for the preparation of the inventive organomodified polysiloxanes is a transition metal-catalyzed hydrosilylation of the olefinically unsaturated polyethers with SiH-functional polysiloxanes to form Si—C linkages, as described, for example, in EP 1 520 870, EP 1439200, EP 1544235, U.S. Pat. No. 4,147,847, U.S. Pat. No. 4,025,456, EP 0493836 or U.S. Pat. No. 4,855,379 and the documents cited therein. Preference is given to using a platinum catalyst to catalyze the hydrosilylation.

The unsaturated polyethers used, on which the radicals of the formula (II) are based, preferably allyl polyethers, can likewise be prepared according to the known prior art. For example, EP 1 360 223 and the documents cited therein describe the preparation of olefinic polyethers with and without derivatization of the OH functionality. U.S. Pat. No. 5,877,268 and U.S. Pat. No. 5,856,369 describe the preparation of allyl-started polyethers with DMC catalysis. DE 19940797 describes the preparation and use of polyalkylene oxides using potassium methoxide as a catalyst. Further processes are described in U.S. Pat. No. 3,957,843, U.S. Pat. No. 4,059,605, U.S. Pat. No. 3,507,923, DE 102005001076 and DE 3121929.

The polyethers are preferably prepared by reacting a starter alcohol, which is preferably allyl alcohol, with ethylene oxide and/or propylene oxide. The polymerization of the alkylene oxides can be performed in pure form or in any desired mixtures. The sequence of the addition steps may be as desired, and so it is possible to obtain random, block or gradient unsaturated polyethers according to the procedure.

An organomodified siloxane used in accordance with the invention can be prepared, for example, as follows: a mixture of 28% by weight of SiH-functional polydimethylsiloxane (where N=approx. 50 and 0.27% by weight of hydrogen) is initially charged. To this is added 22.5% by weight of an allyl alcohol-started copolymer containing 48% by weight of ethylene oxide units and 46% by weight of propylene oxide units, prepared according to the prior art by a KOH-catalyzed reaction. In addition, 36% by weight of an allyl alcohol-started copolymer containing 73% by weight of ethylene oxide units and 24% by weight of propylene oxide units is added thereto, and 13.5% by weight of an allyl alcohol-started copolymer containing 91% by weight of ethylene oxide is added thereto. The mixture is heated to 90° C. while stirring. 5 ppm of platinum is added in the form of a platinum catalyst. Monitoring of the conversion by determining the SiH value (gas volumetric determination) gives 99.5% SiH conversion after 5 h.

The compounds of formula (I) can be used themselves as release agents, or else as a release agent constituent of a release agent. When the compounds of formula (I) are used as a release agent constituent, the release agent used is preferably a mixture or solution of the organomodified polysiloxanes of formula (I) in a solvent. The solvent may be water or an organic solvent, especially an alcohol, preferably ethanol. Particular preference is given to using the organomodified polysiloxanes of formula (I) in the form of aqueous solutions. The aqueous solutions used as release agents contain preferably from 0.5 to 50% by weight, more preferably from 1 to 25% by weight and most preferably from 3 to 18% by weight of organomodified polysiloxanes of formula (I).

In one embodiment, the organomodified polysiloxanes of formula (I) used have a cloud point from 30° C. to 70° C., preferably 35° C. to 60° C. The cloud point is preferably determined on the basis of DIN EN 1890. Among the processes specified therein, preference is given to using that in which 1 g of sample is analyzed with 100 g of water. A solution made up in this way is heated in a test tube/beaker until distinct cloudiness occurs. In the course of cooling and under air while stirring with a thermometer, the temperature is determined at which the solution is clear or only slightly opalescent.

The possible substances to be used for granulation may, for example, be those on page 18 of the brochure "Sandvik—Ihr Partner in der Schmelzengranulierung", PS-442/GER 10.2003. Preferred substances are especially selected from alkane sulfonate, aluminium sulfate, ammonium nitrate, ammonium phosphate, anthracene, antioxidants, antiozonant, asphalt, benzoic acid, bishydroxyethyl terephthalate (BHET), bisphenol A, bitumen, caprolactam, carbazole, crotonic acid, diaminodiphenylmethane (DMA), emulsifiers, oleochemicals, photogelatin, urea, resins, for example acrylic resin, rosin, epoxy resin, hydrocarbon resin, phenol resin, polyamide resin, polyester resin, silicone resin, tall oil resin, calcium stearate, cobalt naphthenate, cobalt stearate, lactam 12, fats, cocoa mass, cheese, chocolate, gelatin, chewing gum base, sauces, soup concentrates, masterbatches, naphthalene, sodium acetate, neopentyl glycol (NPG), paradichlorobenzene, pitch, pesticides, polyethylene glycol, polyethylene terephthalate (PET), polystyrene, polyvinyl acetate, powder coatings, PVC additives, PVC stabilizers, cleaning compositions, soap, synthetic, hot melt adhesives, for example based on ethylene-vinyl acetate, polyurethane, polyamide or polyester, reactive hot melt adhesives, sulfur, sulfur+bentonite, sorbitol, stabilizers, stearic acid, surfactants, toluene diisocyanate (TDI), triazole (BTA, TTA), trimellitic anhydride (TMA), triphenyl phosphate (TPP), subcooling melts, UV stabilizers, waxes, for example paraffin, AKD wax, microwax, PE wax, PP wax, beeswax, filled wax, fragrant wax, wax dyes, montan wax or coating wax, washing composition additives, zinc nitrate or zinc stearate. Very particular preference is given to the inventive use in the case of use of sulfur as the substance to be granulated.

As a result of the preferred use of a release agent/organomodified polysiloxane of formula (I), the sulfur melting temperature of >125° C. brings about the separation of the organomodified polysiloxanes by vaporization of the water. In the immediate environment of the hot sulfur melt, the organomodified polysiloxanes precipitate out of the aqueous solution due to the cloud point of preferably in the range from 30 to 70° C. and are adsorbed on the surfaces of the sulfur and of the steel belt in extremely thin layers and ensure the separation of the granules and influence the shape of the melt granules in such a way that they preferably have a spherical shape and thus also have very little contact with the surface of the steel belt.

The melt granulation is preferably effected as described in U.S. Pat. No. 6,398,989 and U.S. Pat. No. 4,279,579 and in the brochures "Sandvik—Ihr Partner in der Schmelzengranulierung", PS-442/GER 10.2003 and "Sandvik Process Systems—Ihr Partner in industrieller Verfahrenstechnik", PS-400 GER 2.2011, each published by the Sandvik group (www.smt.sandvik.com), more preferably using the apparatuses specified in these documents. Most preferably, the inventive use is effected with a machine as shown in the schematic diagram on page 13 of the brochure "Sandvik—Ihr Partner in der Schmelzengranulierung", PS-442/GER 10.2003. Explicit reference is made to the aforementioned documents with regard to the apparatus used and basic procedure.

In the case of the inventive use, preference is given to using a steel belt cooler. A melt of the substance to be granulated is preferably applied to the steel belt, and the melt is cooled on the steel belt below the melting temperature or the solidification temperature by preferred cooling of the steel belt from below by means of a coolant, preferably water, and is thus solidified.

Preferably, the inventive release agent is applied to the steel belt before the application of the melt. The release agent can be applied to the steel belt, for example, by spray application of the release agent. The amount of the release agent can be selected freely within wide ranges.

The examples adduced hereinafter describe the present invention by way of example, without any intention that the invention, the range of application of which is evident from the overall description and the claims, be restricted to the embodiments specified in the examples.

EXAMPLES

The mode of action of the present invention was tested in a realistic test and compared with conventionally used organomodified siloxanes and silicone oil emulsions. A laboratory system (from SANDVIK) was employed, which contains a Rotoformer® and a water-cooled steel belt (Rotoform system). The release agent constituent used was employed to obtain a 14% by weight aqueous solution (mixture) as a release agent, which was sprayed continuously onto the steel belt. The feedstocks and the description of the separating performance can be found in Table 1.

Preparation of an Inventive Organomodified Siloxane

A mixture of 28% by weight of SiH-functional polydimethylsiloxane (where N=approx. 50 and 0.27% by weight of hydrogen) was initially charged. To this was added 22.5% by weight of an allyl alcohol-started copolymer consisting of 48% by weight of ethylene oxide units and 46% by weight of propylene oxide units, prepared according to the prior art by a KOH-catalyzed reaction. Also added were 36% by weight of an allyl alcohol-started copolymer consisting of 72% by weight of ethylene oxide units and 24% by weight of propylene oxide units, and 13.5% by weight of an allyl alcohol-started copolymer consisting of 91% by weight of ethylene oxide. The mixture was heated to 90° C. while stirring. 5 ppm of platinum was added in the form of a platinum catalyst (hexachloroplatinic acid). The monitoring of conversion by determination of the SiH value (gas volumetric determination) gave 99.5% SiH conversion after 5 h.

Test Conditions:
Belt speed: 11.25 m/min
Rotoformer speed: 12 m/min
Sulphur temperature: 145° C.
Cooling water temperature: 22.2° C.
Steel belt width: 150 mm
Cooling length of the conveyor belt: 2.4 m
Release agent: about 0.02 g of active substance consumed, which is 14% diluted per kg of sulfur

TABLE 1

Release agent constituent and test results

| Release agent constituent | Description of separation performance |
|---|---|
| A 14% by weight aqueous silicone oil emulsion composed of a polydimethylsiloxane from Dow Corning designated DC 200 with a viscosity of 20 cSt. | No easy separation, granules are ellipsoidal, the edges of which break easily. Residues of the release agent build up. |
| An aqueous emulsion, diluted to 14% by weight, of the IPAC SRB PLUS release agent from Sabah (the IPAC SRB PLUS product is a 75% polydimethylsiloxane emulsion). | No easy separation, granules are ellipsoidal, the edges of which break easily. Residues of the release agent build up. |
| 14% by weight aqueous solution of a non-inventive polyether siloxane according to the prior art, TEGOPREN ® 5863, from Evonik Goldschmidt GmbH with the structure of the formula (I) where N = 48, a = 46, b = 2, c = 2, d = 0, R1 is an allyl alcohol-started polyether radical of the formula (II) where f = 11 ang g = 14, and R2 is an allyl alcohol-started polyether radical of the formula (II) where f = 36 and g = 38. | Easy separation at first, which becomes more difficult after 5 minutes. Melt granules deviating from a spherical shape are often obtained, and more frequently flat bodies. |
| Inventive product of the formula (I) where N = 50, a = 40, b = 3, c = 4, d = 3, R1 is an allyl alcohol-started polyether radical of the formula (II) where f = 11 and g = 8, R2 is an allyl alcohol-started polyether radical of the formula (II) where f = 20 and g = 5, | Very easy separation, no deterioration in separation performance after 5 minutes, no residues. Granules have homogeneous spherical shape. |

TABLE 1-continued

Release agent constituent and test results

| Release agent constituent | Description of separation performance |
|---|---|
| and R3 is an allyl alcohol-started polyether radical of the formula (II) where f = 13 and g = 0. | |

As can be inferred from Table 1, inventive organomodified polysiloxanes have much better separation properties than the release agents or release agent constituents known from the prior art to date.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The invention claimed is:

1. A method for producing melt granules comprising:
providing at least one substance for granulation;
heating said at least one substance for granulation to provide a melt of said at least one substance; and
cooling said melt of said at least one substance in the presence of at least one organomodified polysiloxane of formula (I)

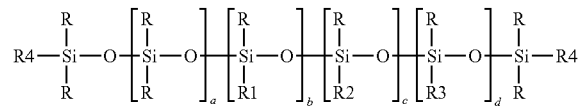

where
$a+b+c+d+2=20$ to $210$,
$a=15$ to $205$,
$b=1$ to $12$,
$c=1$ to $12$,
$d=1$ to $12$,
the R radicals are each independently identical or different, aliphatic or aromatic hydrocarbyl radicals having 1 to 10 carbon atoms,
the R4 radicals are each independently identical or different R, R1, R2 or R3 radicals,
the R1, R2 and R3 radicals are each independently different polyether radicals of general formula (II)

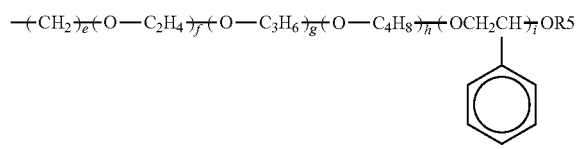

where
$e$ is 3 to 11,
$f$ is 6 to 30,
$g$ is 0 to 15,
$h$ is 0 to 5,
$i$ is 0 to 5, and
R5 are independently the same or different and are each a methyl, acetyl or hydrogen radical.

2. The process of claim 1, wherein the polyether radical of formula (II) has a molecular weight greater than 200 g/mol.

3. The process of claim 2, wherein the proportion of ethylene oxide in said polyether radical of formula (II) is greater than 45% by mass, and the percentage by mass of ethylene oxide in the polyether radical R2 is at least 9% by mass greater than the percentage of ethylene oxide in the polyether radical R1, based in each case on the polyether radicals of formula (II).

4. The process of claim 3, wherein the radicals of formula (II) may each be formed randomly, in a gradient or in blocks.

5. The process of claim 1, wherein the organomodified polysiloxanes of formula (I) are present in an aqueous solution.

6. The process of claim 5, wherein said aqueous solution comprises from 0.5 to 50% by weight of said at least one organomodified polysiloxane of formula (I).

7. The process of claim 1, wherein the at least one organomodified polysiloxane has a cloud point from 35° C. to 60° C.

8. The process of claim 1, wherein said at least one substance for granulation is sulfur.

9. The process of claim 1, wherein the melt is applied to a moving belt, and said moving belt is a steel belt cooler.

10. The process of claim 9, wherein said at least one organomodified polysiloxane of formula (I) is applied to the moving belt before applying said melt to the moving belt.

11. The process of claim 10, wherein said at least one organomodified polysiloxane of formula (I) is applied to said moving belt by spraying.

12. The process of claim 10, wherein said at least one organomodified polysiloxane of formula (I) is applied continuously to said moving belt.

13. The process of claim 1, wherein said at least one organomodified polysiloxane of formula (I) is employed as a sole release agent.

14. The process of claim 1, wherein said at least one organomodified polysiloxane of formula (I) is prepared by hydrosilylation of an unsaturated polyether and a SiH-functional siloxane.

15. The process of claim 1, wherein said at least one organomodified polysiloxane of formula (I) is used in conjugation with a solvent, said solvent is selected from water or an alcohol.

* * * * *